United States Patent
Alessandro (10) Patent No.: US 8,485,497 B2
(45) Date of Patent: Jul. 16, 2013

(54) HYDRAULIC VALVE DEVICE WITH ASSOCIATED SPOOL DISPLACEMENT TRANSDUCER

(75) Inventor: Beneventi Alessandro, Reggio Emilia (IT)

(73) Assignee: Walvoil Fluid Power USA, Tulsa, OK (US)

( * ) Notice: Subject to any disclaimer, the term of this patent is extended or adjusted under 35 U.S.C. 154(b) by 94 days.

(21) Appl. No.: 13/022,659

(22) Filed: Feb. 8, 2011

(65) Prior Publication Data

US 2012/0199770 A1   Aug. 9, 2012

(51) Int. Cl.
*F16K 31/02* (2006.01)

(52) U.S. Cl.
USPC ............... 251/129.04; 137/554; 324/207.2; 324/207.24

(58) Field of Classification Search
USPC ........... 251/129.04; 137/554; 324/202, 207.2, 324/207.21, 207.24, 207.25
See application file for complete search history.

(56) References Cited

U.S. PATENT DOCUMENTS

| | | | |
|---|---|---|---|
| 4,081,635 A | 3/1978 | Moore | |
| 4,107,604 A | 8/1978 | Bernier | |
| 4,561,299 A * | 12/1985 | Orlando et al. | 73/152.61 |
| 4,920,549 A * | 4/1990 | Dinovo | 377/16 |
| 4,953,590 A * | 9/1990 | Kakinuma et al. | 137/554 |
| 5,565,770 A | 10/1996 | Jones | |
| 6,152,172 A | 11/2000 | Christianson et al. | |
| 2004/0017187 A1* | 1/2004 | Van Ostrand et al. | 324/207.21 |
| 2005/0007101 A1 | 1/2005 | Fahrlander et al. | |
| 2005/0011556 A1* | 1/2005 | Dudzik et al. | 137/554 |
| 2005/0127314 A1* | 6/2005 | Piehl et al. | 251/129.04 |
| 2005/0264280 A1 | 12/2005 | Shoji et al. | |
| 2007/0244665 A1* | 10/2007 | Greer et al. | 702/151 |
| 2008/0202608 A1* | 8/2008 | Tschida et al. | 137/554 |
| 2009/0261819 A1 | 10/2009 | Hansson | |

FOREIGN PATENT DOCUMENTS

| | | |
|---|---|---|
| EP | 1 219 935 | 7/2002 |
| FR | 2 897 933 | 8/2007 |

* cited by examiner

*Primary Examiner* — Eric Keasel
*Assistant Examiner* — Ian Paquette
(74) *Attorney, Agent, or Firm* — Young & Thompson (57) ABSTRACT

A hydraulic valve device includes a sensor for determining spool displacement of within the valve. The sensor includes two main subassemblies, a tube assembly and a body assembly; the tube assembly being mounted onto the valve body by the thread so that the tube together with the valve creates a closed space where oil flows; the plunger with the magnet inside, is kept in contact with the valve spool by the spring so that the magnet moves along with the spool, so does also the magnetic field created by the magnet. An integrated circuit on the printed circuit board senses the angle of magnetic field lines and generates an output signal proportional to the movement of the spool.

11 Claims, 9 Drawing Sheets

HYDRAULIC VALVE DEVICE WITH ASSOCIATED SPOOL DISPLACEMENT TRANSDUCER

BACKGROUND OF THE INVENTION

The invention concerns an hydraulic valve comprising a body, mono-block or bankable, in which is present at least a spool movable axially for controlling flu id flow which flows in inner channels of said hydraulic valve, and relates to at least a sensor designed to sense the position of the spool of said hydraulic valve and give out a corresponding electrical signal.

DESCRIPTION OF THE RELATED ART

In the prior art it is desirable monitor and/or check the movements of spools within the spool bore of the hydraulic valve devices.

U.S. Pat. No. 4,107,604 discloses an "Hall effect displacement transducer using a bar magnet parallel to the plane of the Hall device"—A position indicating device for providing a generally linear output in response to displacement; the system includes a Hall effect device and apparatus for providing a response therein in accordance to displacement of a movable stylus or plunger and the method of making the same.

U.S. Pat. No. 5,565,770 relates to magnetic sensors, and in particular to sensors for cyclic lubricant feeders utilizing reciprocating distributor valves, the sensor being a magnetic sensor for sensing the movement of a reciprocating valve. The sensor provides a threaded nozzle for screwing into the block with a bore therethrough. A magnet holder extends out of the nozzle and mounts a magnet thereto recessed inside the housing. The magnet holder is moveable reciprocally by the reciprocating spool. A sensor body is connected to the housing and holds a magnetic sensing element such as a Hall effect sensor adjacent to the housing for sensing the proximity of the magnetic field of the reciprocating magnet. In other words it discloses a magnetic proximity switch for a reciprocating lubrication distributor block having reciprocating spools therein, comprising:
   a housing having a threaded nozzle for screwing into the block aligned with one of the spools, said threaded nozzle having a longitudinal bore with an open first end and a closed second end;
   a magnet holder held reciprocally within said bore and extendable out of said first end into said block to be abuttable by said spool, said magnet holder reciprocally driven by a pushing force from said spool;
   a magnet held by said holder within said bore; a spring arranged within said housing and urging said magnet holder away from said closed second end, said spring surrounding said magnet;
   a sensor body connected to said housing at said second end;
   a magnetic sensing element mounted within said sensor body outside said housing and responsive to position of a magnetic field created by said magnet through said closed second end.

FR2897933 discloses an "Element's e.g. slide, linear movement detecting device for e.g. hydraulic distributor, has fixed housing integrated with Hall effect sensor, and movable unit including magnet and non-magnetic material body overmolded around magnet". The device has a tube comprising a fixed housing integrated with two Hall effect sensors, and a movable member moving with respect to the housing. The movable unit has a magnet and a non-magnetic material body overmolded around the magnet. One of the Hall effect sensors is connected to a processing unit via a flexible card, and the body and the tube are made of plastic material. The housing further comprising guide means in translation of the movable.

EP1219935 discloses a switching element of the pickup for the hydraulic unit is a reed switch and the operator is a bar magnet. The longitudinal axis of the bar magnet is arranged within at least one section of the path, at least approximately parallel to the longitudinal axis of the reed switch, and approximately parallel to the movement direction. The section determined in size and position within the path, by the reed switch on the basis of a lateral weak region of the force field of the bar magnet, existing in the direction of the longitudinal axis of the bar magnet, is indicated.

U.S. Pat. No. 6,152,172 discloses an hydraulic control valve having a spool slidably received in a bore of the valve body. The spool can be moved in opposite directions to control flow fluid to and from a pair of workports. A sensor assembly has a coupling attached to the spool and holds a permanent magnet. A Hall effect sensor produces an electrical signal indicating the position of the permanent magnet and thus the spool. A double acting spring assembly biases the coupling and spool with respect to the housing of the sensor when the spool moves in one direction, and biases the coupling and spool with respect to the valve body when the spool moves in the other direction.

US2009/0261819 relates to a sensor arrangement is arranged to detect at least one position of a displaceable component in a fluid device, which fluid device comprises a wall enclosing a cavity, in which cavity the component is displaced by pressurized fluid selectively applied to the component. The sensor arrangement includes a magnetic sensor mounted outside the wall and a first sensor element that is connected to the magnetic sensor and extends through the wall and a predetermined distance into the cavity. The magnetic sensor is arranged to detect the position of at least one predetermined second sensor element located on the displaceable component by sensing a change in magnetic flux induced in the first sensor element by the second sensor element.

SUMMARY OF THE INVENTION

The invention provides an hydraulic valve comprising a body, mono-block or bankable, in which is present at least a spool movable axially for controlling fluid flow which flows in inner channels of said hydraulic valve; the invention relates to at least a sensor designed to sense the position of the spool of said hydraulic valve and give out a corresponding electrical signal.

An object of the present invention is to provide a sensor which is able to detect the position of a spool in a hydraulic valve device and precisely a sensor which measure the linear displacement of the spool of a valve, wherein said measurement is obtained reading, namely sensing, the angle of the magnetic field lines.

It is another object of the invention provide a sensor be readily suitable for existing hydraulic valve.

It is another object of the present invention to provide a sensor is insensitive to external magnetic influences, both environmental, magnetically and electrical.

It is another object of the invention to provide a magnet housing sealable to the block of hydraulic valve and formable a closed compartment for a magnet (i.e., a magnet housing); to provide a sensor body for holding electronics including a sensing element, in which the sensor body is isolated by the magnet housing to prevent oil entrance.

Magnet housing and sensor body are separated, namely modular pieces which can be readily assembled/disassembled together either before or after installation of the sensor to the hydraulic valve device.

The objects of the invention are achieved by the sensor of present invention applied to the hydraulic valve.

Specifically, a magnet provided inside a magnet housing and said sensor body being effectively sealed to the hydraulic body by threaded engagement thereto compressing a gasket or O-ring seal.

The magnet housing is open to the block, particularly to the spool inside the block.

Said sensor is fixed or mounted on the valve by means of thread so that a plunger of the sensor can move axially together with the spool of the hydraulic valve, being plunger kept in contact with spool by a spring placed internal to said housing.

When the magnet moves along with the spool, it creates a variation of magnetic field and a magnetic pickup of a integrated circuit on a printed circuit board, positioned in the sensor, senses the variation of angle of the magnetic field lines and generates an output signal proportional to the movement of the spool.

A magnet holder or magnet carrier is used to hold the magnet within the magnet housing and keeps the magnet steady and protected within said magnet housing.

The magnet holder is constructed preferably of brass or non magnetic steel in order to avoid disturbing or distorting the magnetic field of the permanent magnet into the sensor.

The magnet holder and the magnet housing are adapted such that the magnet holder has two locations of contact or support along its length for stability and guidance as it slides inwardly/outwardly within the housing with the movement of the spool, reducing lateral vibrations and preventing rotation around the axis (AA).

The magnet holder/carrier material can be selected to be compatible with repetitive impact by the spool.

Moreover sensor body is provided for holding an integrated circuit on a printed circuit board.

In a first embodiment such integrated circuit is a Hall Effect type sensor.

In a second embodiment such integrated circuit is a magneto-resistive type sensor.

DESCRIPTION OF THE PREFERRED EMBODIMENTS

As illustrated in the figures from 1 to 8, the invention relates to a sensor 30 applied to a hydraulic valve 20.

Said sensor 30 comprising at least two main subassemblies applied to said hydraulic device: Tube Assembly and Body Assembly (refer to FIG. 7—exploded drawing)

Figure 7:
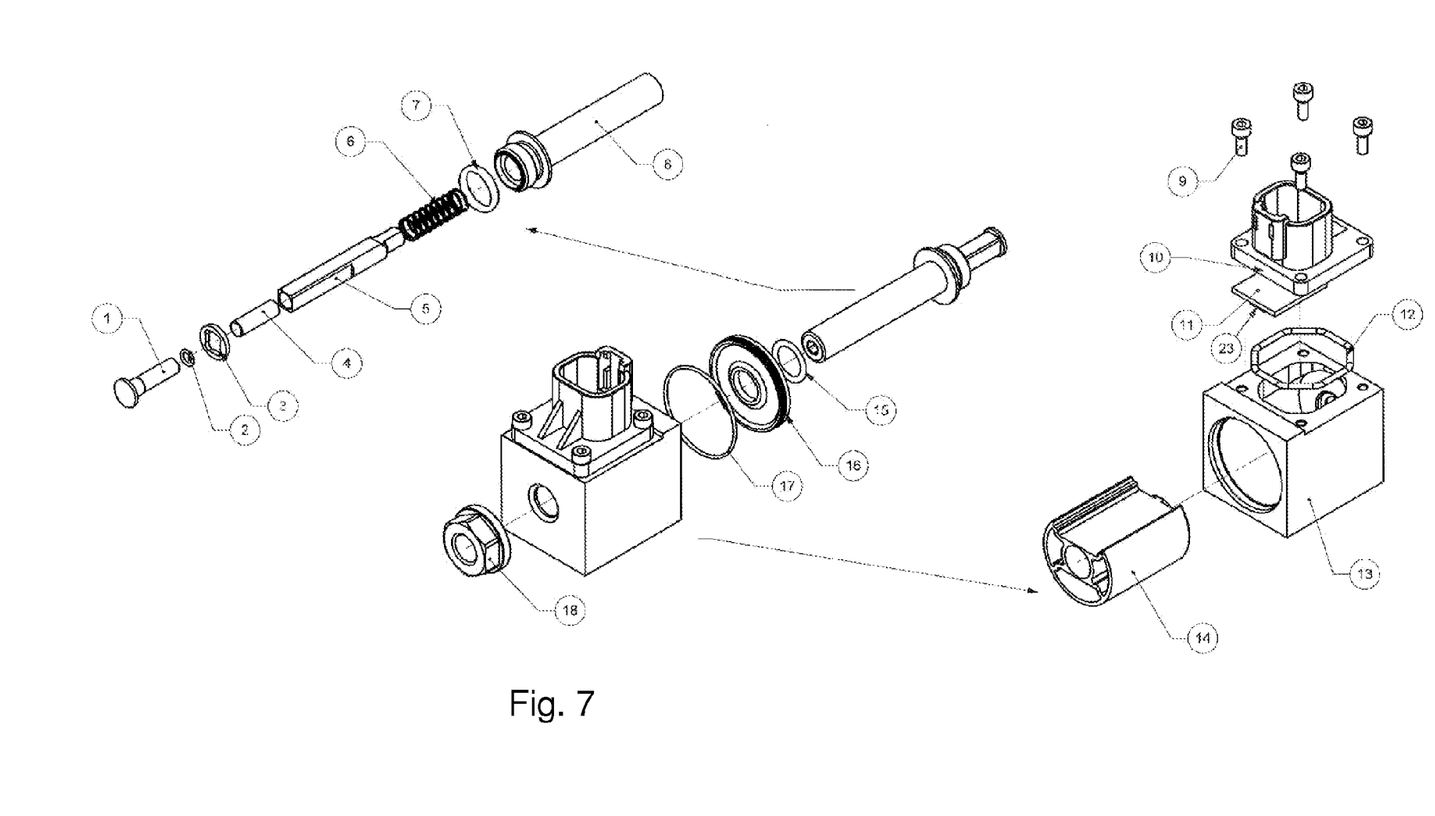
FIG. 7: is an exploded view of the sensor illustrated in FIG. 6, FIG. 8: is a sectional view of the sensor illustrated in FIG. 6, and FIG. 9: is a sectional view (A-A) of FIG. 1, with an alternative hydraulic valve body.
Figure 8:
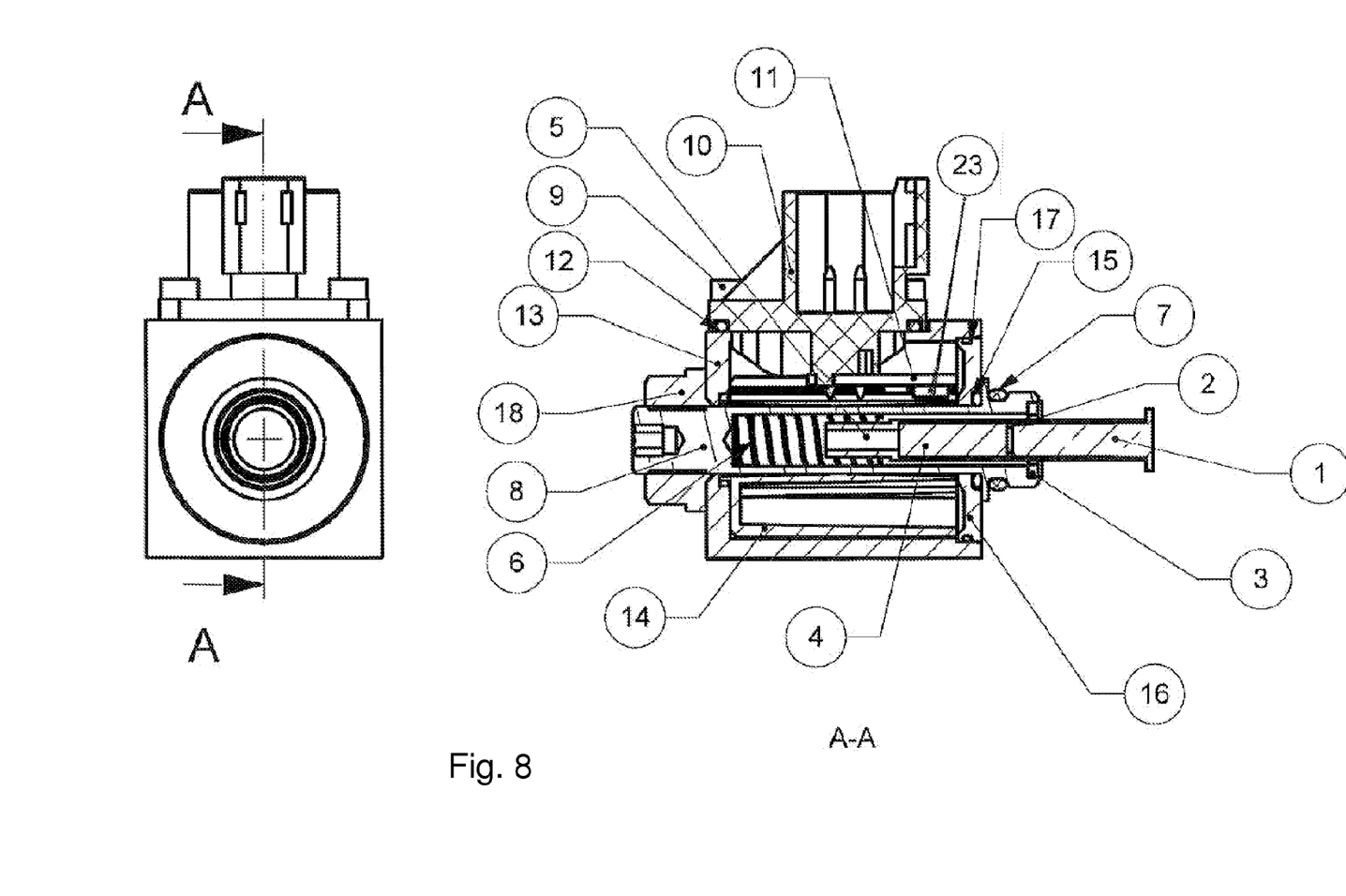

Said Tube Assembly (corresponding to parts numbered from 1 to 8) comprises at least:
- a tube 8 designed to resist oil pressure and serve as a magnet housing,
- a moving plunger 1,2,4,5 with a permanent magnet 4 inside; said moving plunger is defined by a magnet carrier 5, having elongated shape; in said magnet carrier 5 is present a bore closed by the plunger 1; eventually one or more spacer 2 will be put inside in order to keep the magnet 4 steady and protected within said bore of magnet carrier 5,
- a spring 6 to keep said moving plunger in contact with the moving spool 21 of the hydraulic valve 20;
- an anti-spin device 3 for preventing the plunger to rotate around its axis AA; said anti-spin device 3 has at least one linear surface suitable to cooperate to a corresponding planar surface of the magnet carrier 5; in the example said anti-spin device 3 is an annular element provided a polygonal central bore and having shape partially corresponding to the section of the magnet carrier 5. The anti-spin device is fixed, e.g., by press-fit, to the inside of the tube 8. This will fix the physical relationship of the magnet 4 with respect to the remaining elements of the sensor 30, e.g., with respect to PC board 11 (discussed below). It is noted that the magnetic field of the magnet 4 may not be uniform and therefore it is important to maintain an indexed relationship between the magnetic field of the magnet 4 and the magnetic pickup 23 of the PC board 11.

Said Tube assembly is further provided with gasket or O-Ring seal for sealing the tube 8, namely the sensor 30, against the valve 20.

The Body Assembly (corresponding to parts numbered from 9 to 18) comprises at least:
- a connector (9,10,12) for power supply and output signals, namely a connector 10, connector screw 9 and connector O-Ring seal 12
- a printed circuit board 11 with the integrated circuit and other electronics
- a body 13 and a tube and PC board holder 14 with a planar surface for supporting the printed circuit board 11; said tube and PC board holder 14 provided with an axial bore which allocates the tube 8 previously defined; said body 13 is constituted by ferromagnetic material
- a non magnetic body cover 16,
- a Seal-lock nut 18 to keep everything together.
- With 15 and 17 two gaskets or O-Rings are identified for sealing the tube 8 with the body 13 and the tube and PC board holder 14.

Figure 1:
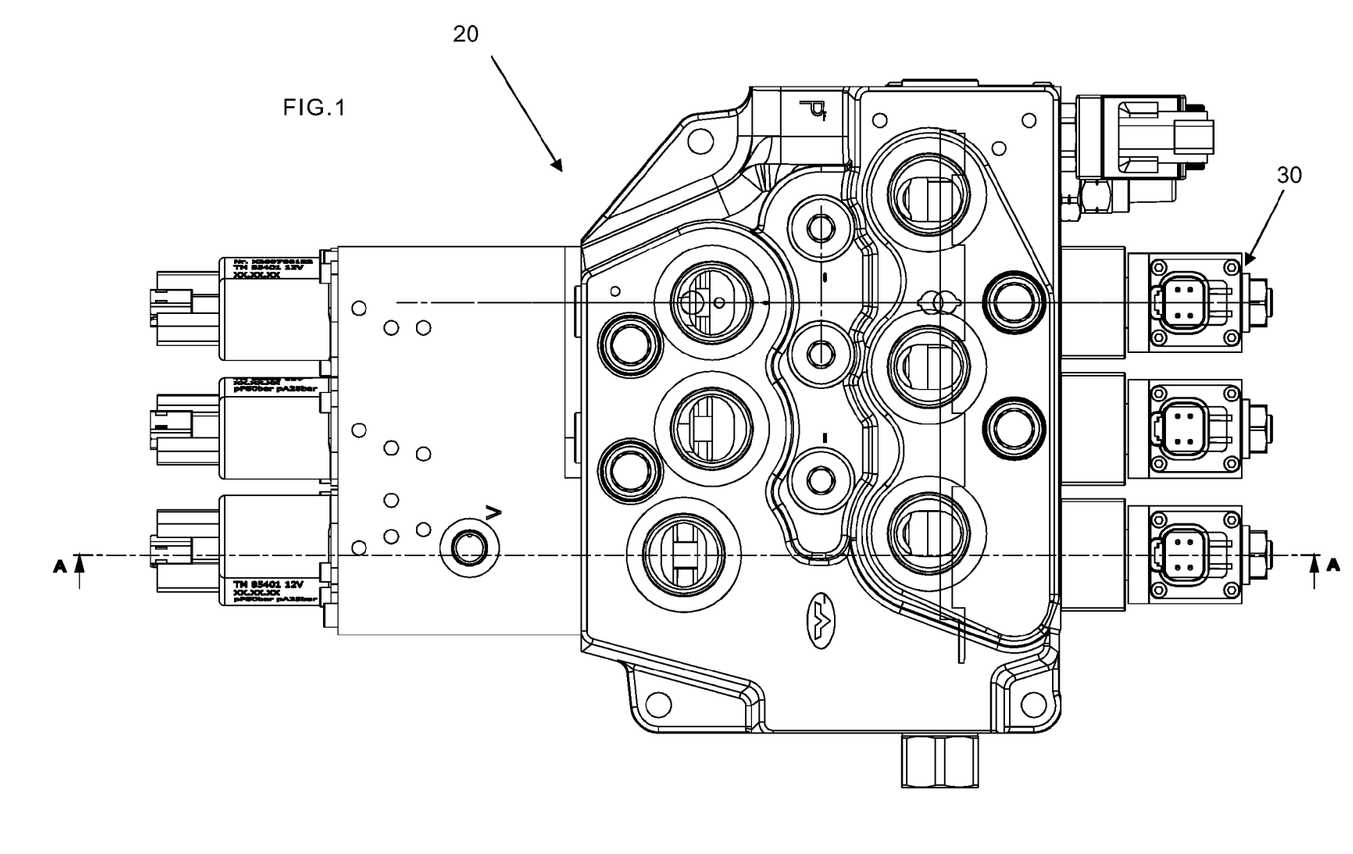
FIG. 1: is a top view of an hydraulic valve with three spools for controlling fluid flow; each spool having a lateral sensor device attached for sensing the position of said spool and give out a corresponding electrical signal.
Figure 2:
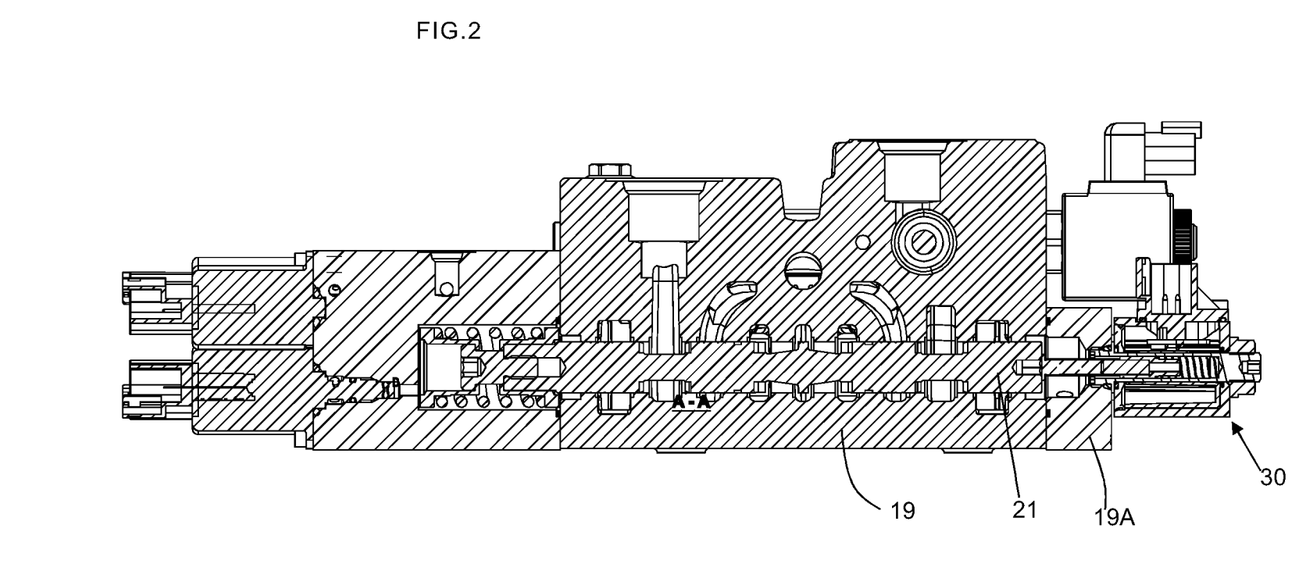
FIG. 2: is a sectional view (A-A) of previous figure.
Figure 3:
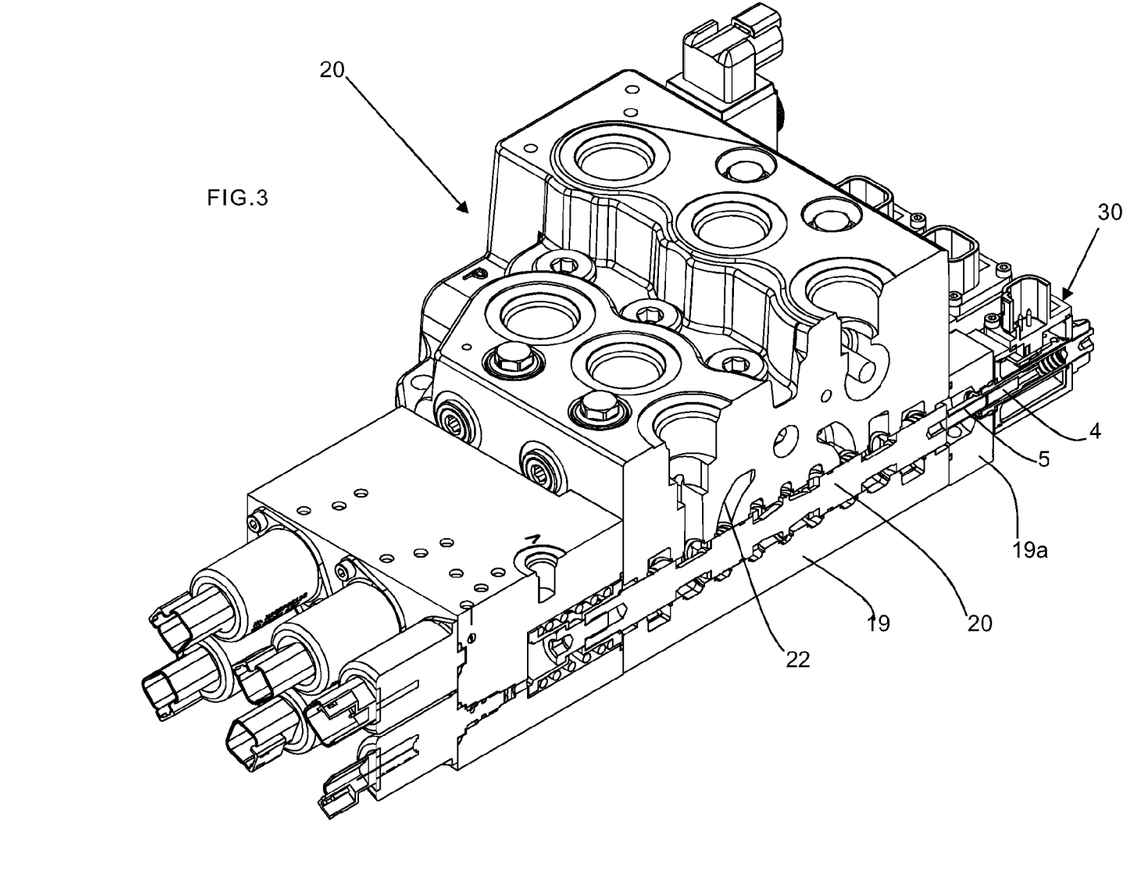
FIG. 3: shows a prospective view of the hydraulic assembly with sensor drafted in FIG. 1, FIG. 4: shows a section of a bankable hydraulic device with sensor associated.
Figure 4:
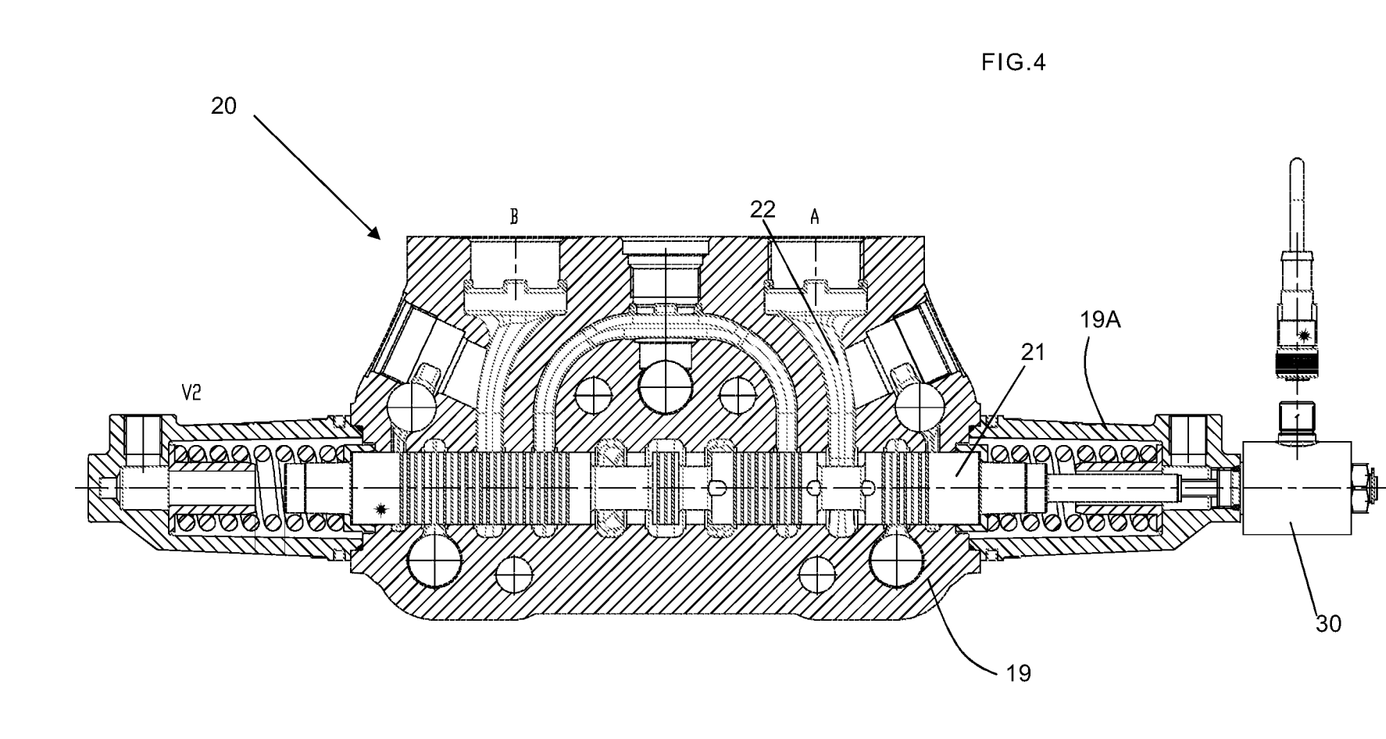
Figure 5:
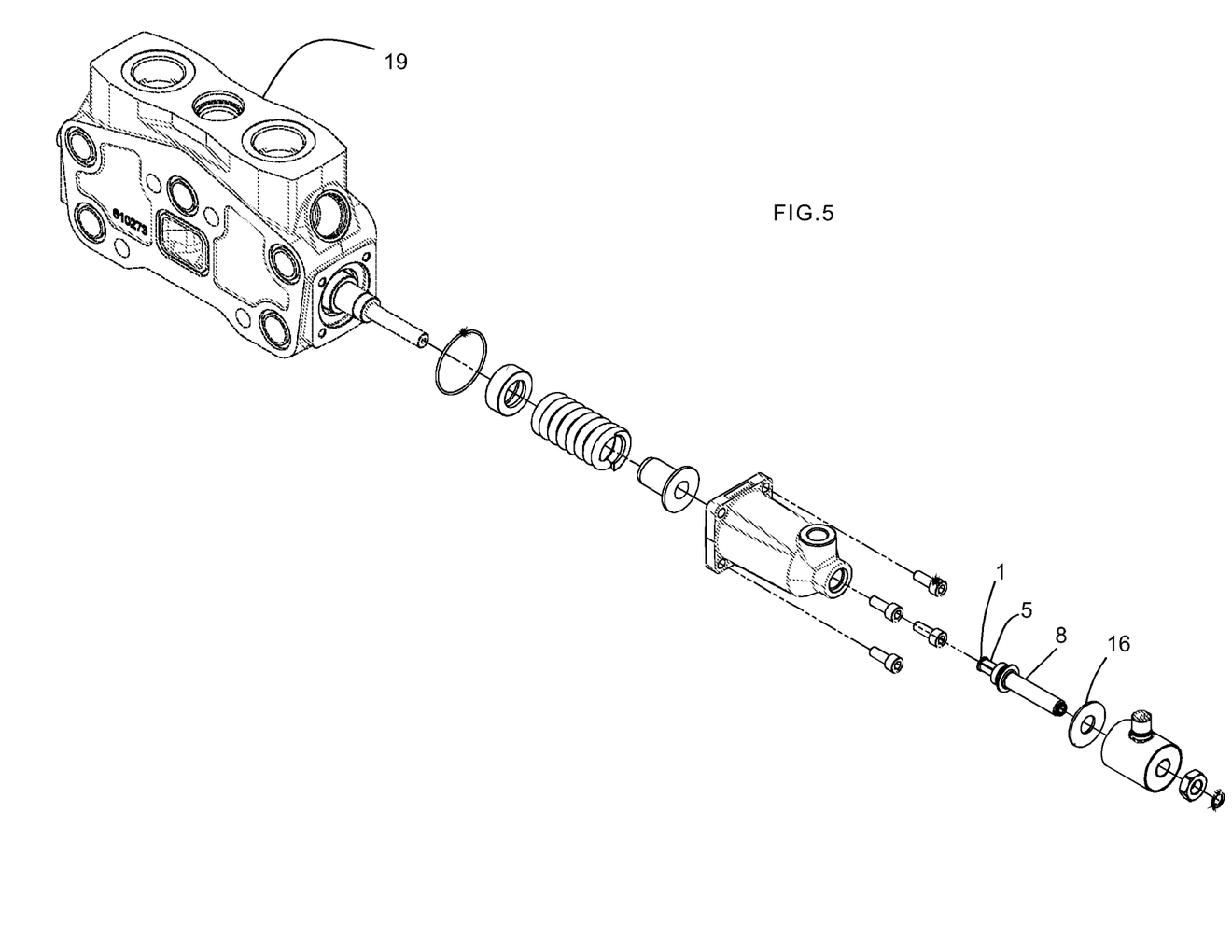
FIG. 5: shows an exploded view of FIG. 4, FIG. 6: shows in details the sensor of previous figures.
Figure 6:
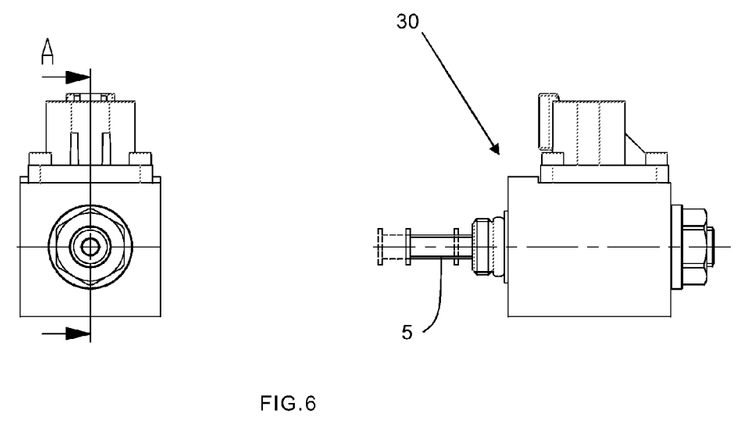

Said Tube Assembly is mounted onto the hydraulic valve body 19 by means of the thread 8A in tube 8; said thread 8A directly engages the body 19 or alternatively it engages an element 19A interposed between said body 19 and the sensor, as shown in FIG. 2.

The tube 8 together with the body 19 or spacer element 19A creates a closed space where oil flows.

The plunger 1,2,4,5 with the magnet 4 inside, is kept in contact with the valve spool 21 by the spring 6 so that the magnet 4 moves along with the spool 21; so does also the variation of angle of magnetic field created by the magnet.

The integrated circuit on said printed circuit board 11 senses the variation of angle of the magnetic field lines and generates an output signal proportional to the movement of the spool 21.

In embodiment illustrated in the figures such integrated circuit is an Hall Effect type sensor.

However, in a second embodiment, not illustrated, such integrated circuit could be a magneto-resistive type sensor.

The integrated circuit is of the type sensitive to the direction of the magnetic field (variation of angle of the magnetic field lines) and not to the magnitude. This allows larger tolerances in the dimensions of the parts (different air gaps between magnet and Hall chip), allows working in wide temperature ranges (e.g. with high temperatures the magnetic field changes magnitude but does not change direction) and compensates well the aging of the permanent magnet.

Advantages:
High Pressure Tube: can be used in high pressure control valves;
Anti spin device: can be used with less expensive magnets;
integrated circuit sensitive to direction of the magnetic field:
  can compensate for different air gaps,
  can work in wide temperature ranges,
  insensitive to magnet aging,
Non magnetic body-cover 16: does not disturb the internal magnetic field;
Magnetic screening body 13 (ferromagnetic): protects from external disturbing magnetic fields;
Sealed from external contaminants (water, chemicals)
Programmable:
  can be adjusted for different valves models,
  can give different types of output (discrete, continuous, . . . ), and
  can be individually calibrated to reduce errors.

Figure 9:
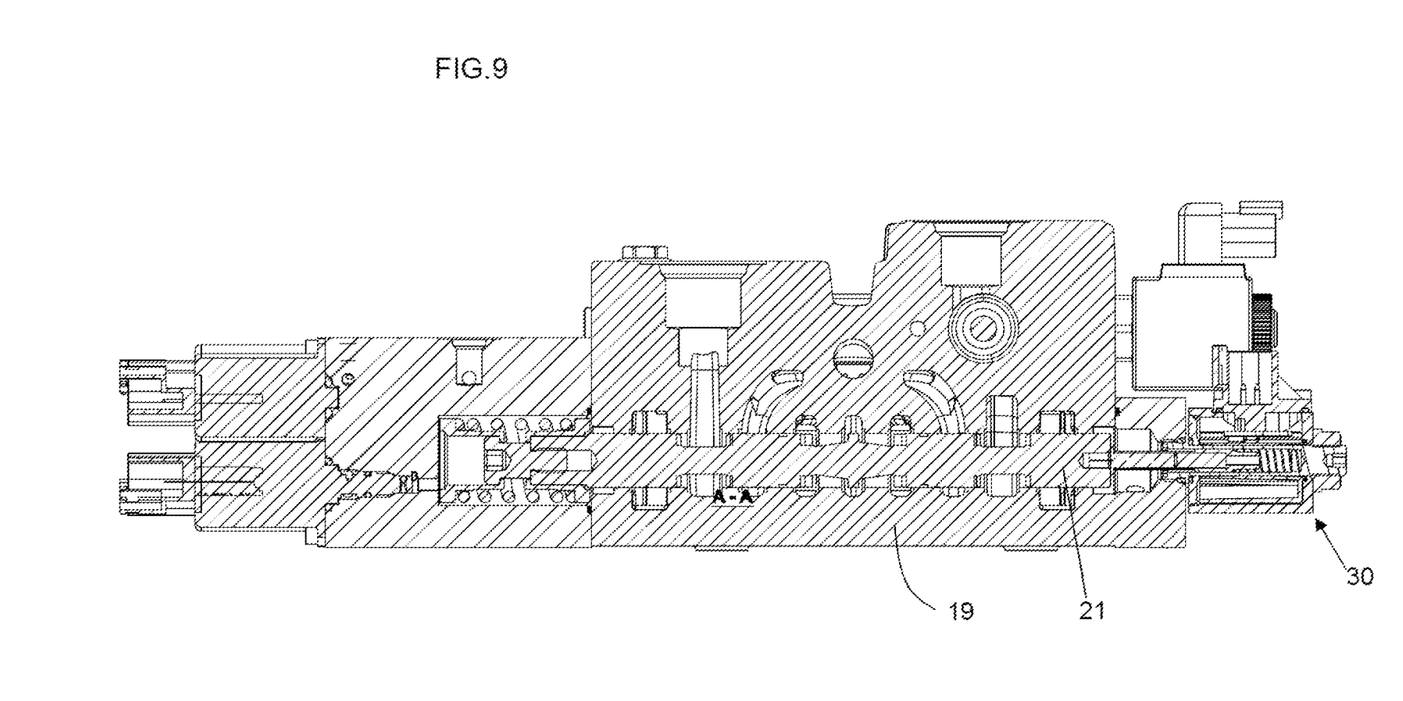

With reference to the drawing figures, a preferred embodiment of the inventive hydraulic valve (20) comprises a valve body (19); inner channels (22) within the valve body, the inner channels defining passages for fluid flow; at least a spool (21) present in the body, the spool movable axially in order to control the fluid flow in the inner channels (22); and at least a sensor (30) attached to said body (19), said sensor (30) movable with the spool (21) to i) sense a current position of the spool, and ii) give out a corresponding electrical signal indicating the current position of the spool. The sensor (30) measures a linear displacement of the spool (21) by sensing an angle of magnetic field lines and is attached to said body (19) either i) via an interposed element (19A, FIG. 2), or ii) directly to said body (19, FIG. 9).

The sensor comprises a tube assembly, which is in turn comprised of at least i) a tube (8) resistant to oil pressure, the tube comprising a thread (8A), the sensor mounted on the valve body by the thread so that the tube together with the valve body create a closed space where oil flows, the tube serving as the magnet housing, ii) a moving plunger (1, 2, 4, 5) having an axis (AA), iii) a magnet carrier (5) with a permanent magnet (4) located in an inside of the magnet carrier, iv) a spring (6) placed internal to the tube (8) and acting against the magnet carrier (5), the spring keeping the plunger, with the magnet (4) inside the magnet carrier, in contact with the spool (21), v) an anti-spin device (3) cooperating with the moving plunger and preventing the moving plunger from rotating around the axis (AA); and a body assembly.

The body assembly comprises at least i) a connector (9,10, 12) for power supply and output signals, ii) a printed circuit board (11) with an integrated circuit, iii) a body (13) supporting the integrated circuit and the tube, iv) a tube and PC board holder (14) within the body, v) a non-magnetic body cover (16), and vi) a seal-lock nut (18) keeping the tube assembly mounted in the body assembly.

With this arrangement, the magnet moves along with the spool and creates a variation in a magnetic field during movement with the spool, and the integrated circuit measures a linear displacement of the spool (21) by sensing a variation in an angle of magnetic field lines of the magnetic field from the permanent magnetic and generates an output signal proportional to the movement of the spool (21).

Advantageously, the body (13) of the body assembly is comprised of a ferromagnetic material protecting the sensor from external disturbing magnetic fields. Further, the magnet carrier may be comprised of one of brass and non-magnetic steel, the magnet carrier not distorting the magnetic field from the permanent magnet.

Either gaskets and O-rings (12, 15, 17) serve for sealing i) the non-magnetic body cover (16) with the tube (8), ii) the non-magnetic body cover (16) with the body (13) of the body assembly, and iii) the connector (10) with the body (13).

Also either a gasket or an O-ring (7) may be provided for sealing the tube (8) against the valve body (19).

In order to maintain an indexed relationship between the magnetic field of the magnet 4 to the magnetic pickup 23 of the PC board 11, the anti-spin device (3) is fixed to an interior surface of the tube (8), thereby preventing the magnet (4) and magnet carrier (5) of the moving plunger from rotating around the axis (AA). Further, the PC board holder (14) is adapted to support the PC board (11) and maintain the indexed relationship between the magnetic field of the magnet (4) and the magnetic pickup of the PC board (11).

The magnetic pickup (23) of the integrated circuit is sensitive to the direction of the magnetic field and is insensitive to a magnitude of the magnetic field. The sensor (30) may be, e.g., a "Hall Effect" sensor or a magneto-resistive sensor. Further the sensor (30) is programmable. The sensor (30) provides plural, different types of outputs and be calibrated in order to reduce errors. Such a sensor can be adapted to different valve models.

| DETAILED DESCRIPTION | |
| --- | --- |
| Number | Name |
| 1 | Plunger |
| 2 | Magnet spacer |
| 3 | Anti-spin |
| 4 | Magnet |
| 5 | Magnet Carrier |
| 6 | Spring |
| 7 | Tube-Valve OR |
| 8 | Tube |
| 9 | Connector Screws |
| 10 | Connector |
| 11 | Printed circuit board (PCB) |
| 12 | Connector OR |
| 13 | Body |
| 14 | Tube and PC board holder |
| 15 | Tube-Body OR |
| 16 | Body Cover |
| 17 | Body Cover OR |
| 18 | Seal-lock NT |
| 19 | Body of hydraulic valve |
| 20 | Hydraulic valve |
| 21 | Spool |
| 22 | Internal channels |
| 23 | Magnetic pickup |

It is claimed:

1. A hydraulic valve (20), comprising:
a valve body (19);
inner channels (22) within the valve body, the inner channels defining passages for fluid flow;

at least a spool (21) present in the body, the spool movable axially in order to control the fluid flow in the inner channels (22); and at least a sensor (30) attached to said body (19), said sensor (30) movable with the spool (21) to i) sense a current position of the spool, and ii) give out a corresponding electrical signal indicating the current position of the spool, wherein said sensor (30) measures a linear displacement of the spool (21) by sensing an angle of magnetic field lines, wherein said sensor comprises:

a tube assembly comprising at least i) a tube (8) resistant to oil pressure, the tube comprising a thread (8A), the sensor mounted on the valve body by the thread so that the tube together with the valve body create a closed space where oil flows, the tube serving as a magnet housing, ii) a moving plunger (1, 2, 4, 5) having an axis (AA), iii) a magnet carrier (5) with a permanent magnet (4) located in an inside of the magnet carrier, iv) a spring (6) placed internal to the tube (8) and acting against the magnet carrier (5), the spring keeping the plunger, with the magnet (4) inside the magnet carrier, in contact with the spool (21), v) an anti-spin device (3) cooperating with the moving plunger and preventing the moving plunger from rotating around the axis (AA); and a body assembly comprising at least i) a connector (9,10,12) for power supply and output signals, ii) a printed circuit board (11) with an integrated circuit serving as magnetic pickup (23), iii) a body (13) supporting the integrated circuit and the tube, iv) a tube and PC board holder (14) within the body, v) a non-magnetic body cover (16), and vi) a seal-lock nut (18) keeping the tube assembly mounted in the body assembly, wherein, said magnet moves along with the spool and creates a variation in a magnetic field during movement with the spool, and the integrated circuit measures a linear displacement of the spool (21) by sensing a variation in an angle of magnetic field lines of the magnetic field from the permanent magnetic and generates an output signal proportional to the movement of the spool (21).

2. The hydraulic valve of claim 1, wherein said body (13) of the body assembly is comprised of a ferromagnetic material protecting the sensor from external disturbing magnetic fields.

3. The hydraulic valve of claim 1, wherein the magnet carrier is comprised of one of brass and non-magnetic steel, the magnet carrier not distorting the magnetic field from the permanent magnet.

4. The hydraulic valve of claim 1, further comprising one of gaskets and O-rings (12, 15, 17) sealing i) the non-magnetic body cover (16) with the tube (8), ii) the non-magnetic body cover (16) with the body (13) of the body assembly, iii) the connector (10) with the body (13) of the body assembly.

5. The hydraulic valve of claim 1, further comprising one of a gasket and an O-ring (7) sealing the tube (8) against the valve body (19).

6. The hydraulic valve of claim 1, wherein, the anti-spin device (3) is fixed to an interior surface of the tube (8), thereby preventing the magnet (4) and magnet carrier (5) of the moving plunger from rotating around the axis (AA), the PC board holder (14) is adapted to support the PC board (11) and maintain an indexed relationship between the magnetic field of the magnet (4) and the magnetic pickup (23) of the PC board (11).

7. The hydraulic valve of claim 1, wherein the magnetic pickup of the integrated circuit is sensitive to the direction of the magnetic field and is insensitive to a magnitude of the magnetic field.

8. The hydraulic valve of claim 1, wherein said sensor (30) is a "Hall Effect" sensor.

9. The hydraulic valve of claim 1, wherein said sensor (30) is a magneto-resistive sensor.

10. The hydraulic valve of claim 1, wherein the sensor (30) is programmable.

11. The hydraulic valve of claim 10, wherein the sensor (30) provides plural, different types of outputs.

* * * * *